May 21, 1963 A. L. LEE ET AL 3,090,629

FLUID SEAL

Filed March 16, 1960

INVENTORS
ARTHUR L. LEE
ARTHUR B. COVAL
BY
*Stanley J. ...*

THEIR ATTORNEY

United States Patent Office 3,090,629
Patented May 21, 1963

3,090,629
FLUID SEAL
Arthur L. Lee and Arthur B. Coval, Columbus, Ohio, assignors to Consolidated Coal Company, Pittsburgh, Pa., a corporation of Pennsylvania
Filed Mar. 16, 1960, Ser. No. 15,476
2 Claims. (Cl. 277—95)

The present invention relates to a fluid seal and more particularly to a running seal to prevent leakage of fluid between a fixed housing member and a relatively rotatable shaft.

An effective shaft seal should be radially compact, have low friction qualities, and prevent fluid leakage while, at the same time, being easy to assemble and install on a shaft.

The present invention contemplates a shaft seal assembly which provides a double running seal between a shaft and a housing member. By "running seal" is meant a seal between two relatively movable bodies as opposed to a static seal where the two bodies between which a seal is created do not move relative to each other. It is well recognized in the seal art that static seals do not present the problems of low friction, high pressure leakage, and wear that are inherent in running seals.

The present invention contemplates provision of a radially compact seal assembly which includes smooth, polished, planar surfaces to provide a running seal between two relatively rotatable elements. The seal elements contact each other axially to provide radial compactness to the assembly. Further, the axial contact between the sealing elements permits wear compensation to be provided between the seal elements.

The present invention also contemplates provision of seal rings which may be formed of self-lubricating plastic material. Many self-lubricating plastics do not have the inherent resiliency which is required for many types of seal applications. The present invention provides a structure which may utilize relatively non-resilient plastic seal rings which have self-lubricating qualities.

One species of the present invention is directed to a cartridge type seal which may be utilized without any special preparation of the shaft and housing member to receive the seal. This cartridge type seal is a complete unit which may be positioned coaxially about a rotating shaft and press fitted into a fixed housing member.

With the foregoing considerations in mind, it is the principal object of the present invention to provide an improved fluid seal.

Another object of this invention is to provide a low friction, radially compact, easily assembled shaft seal.

Another object of this invention is to provide a seal in which seal rings of self-lubricating, relatively nonresilient, plastic may be utilized.

A further object of this invention is to provide a seal assembly which has a double running seal between the relatively rotatable members.

Another object of this invention is to provide a cartridge seal unit which may be installed on a shaft without special preparation of the shaft and surrounding housing member.

These and other objectives achieved by this invention will become apparent as this description proceeds in conjunction with the accompanying drawings.

Figure 1:
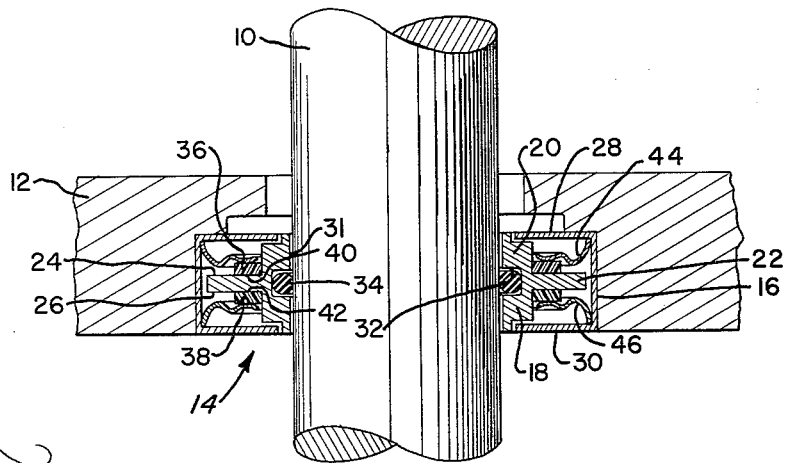
FIGURE 1 is a sectional view of a cartridge type shaft seal built in accordance with the principles of the present invention.

Referring now to the drawings, and particularly to FIGURE 1, a rotatable shaft 10 is shown journaled for rotation within a fixed housing member 12. The rotatable shaft 10 may be supported by appropriate bearings (not shown) within the fixed housing member 12. A cartridge seal unit indicated generally at 14 provides a running fluid seal between the shaft 10 and the housing member 12.

The cartridge seal unit 14 has an annular cartridge member 16 which is generally U-shaped in radial cross section. The open portion of the U-shaped cross section faces the shaft 10. The cartridge member 16 may be press fitted into the housing member 12 to create a static fluid seal between the housing 12 and the annular cartridge member 16. If required to create a complete fluid seal, a gasket member (not shown) may be placed between the cartridge member 16 and housing 12.

Disposed within the annular cartridge member 16 is an annular shaft engaging member 18. Shaft engaging member 18 has a hub portion 20 and a radially extending flange portion 22. The flange portion has planar, polished surfaces 24 and 26 formed on each of its annular faces. The planar, polished surfaces 24 and 26 of the flange portion 22 are parallel to each other and substantially parallel to the annular end walls 28 and 30 of the cartridge member 16. The planar, polished surfaces 24 and 26 are substantially equidistant from the respective end walls 28 and 30.

The annular shaft engaging member 18 is disposed about the rotating shaft 10 and adapted to rotate therewith. The cylindrical internal surface 31 of the annular shaft engaging member 18 is in close sliding relation with the outer cylindrical surface of the shaft 10. Formed in the internal cylindrical surface 31 of shaft engaging member 18 is an annular groove 32 which receives an O-ring 34. The O-ring 34 provides a static fluid seal between the shaft 10 and the shaft engaging member 18 which rotate together.

A seal 36 is disposed between the planar surface 24 of the shaft engaging member 18 and the annular end wall 28 of the cartridge member 16. Another seal ring 38 is disposed between the planar surface 26 of the shaft engaging member 18 and the annular end wall 30 of the cartridge member 16. The seal rings 36 and 38 have planar surfaces 40 and 42 respectively formed thereon. These planar surfaces 40 and 42 are abutting the respective planar surfaces 24 and 26 formed on the flange portion 22 of shaft engaging member 18.

The seal rings 36 and 38 may be formed of any appropriate material, although in the preferred construction, a self-lubricating, relatively nonresilient plastic material such as Teflon, a tetrafluoroethylene polymer, is utilized for the seal rings. In the preferred construction, the shaft engaging member 18 is metallic and may be formed of a copper-bronze alloy.

A resilient annular diaphragm member 44 is disposed between the seal ring 36 and the cartridge end wall 28 to resiliently bias the seal ring 36 into contact with the planar surface 24 of shaft engaging member 18. Another resilient annular diaphragm member 46 is disposed between the seal ring 38 and the cartridge end wall 30 to bias the seal ring 38 into contact with the surface 26 on shaft engaging member 18. The resilient, annular diaphragm members 44 and 46 are sealingly fixed to the cartridge member 16 and are sealingly fixed to the respective seal rings 36 and 38. The resilient annular diaphragm members 44 and 46 may be formed of spring metal of an elastomer such as rubber. The resilient, annular diaphragm members 44 and 46 produce substantially the same force on opposite sides of the shaft engaging member 18 to thereby maintain the shaft engaging member equidistant between the end walls 28 and 30 of cartridge member 16.

The annular end walls 28 and 30 of the cartridge member 16 overlie the shaft engaging member hub portion 20 so that they maintain the shaft engaging member 18 axially centered within the annular cartridge member 16 during installation of the seal. Once the seal is installed, the force of the diaphragm members 44 and 46 centers the seal between the end walls 28 and 30. The shaft engaging member 18 may be moved relative to the shaft 10 since there is a sliding clearance therebetween. The O-ring 34, however, that provides a static seal between the shaft engaging member 18 and the shaft 10 produces a high coefficient of friction between the shaft engaging member 18 and shaft 10 so that the member 18 and the shaft 10 do not under ordinary operating conditions move relative to each other.

In operation, the shaft 10 and the shaft engaging member 18 rotate as a unit and fluid cannot pass between them because of the static seal formed by O-ring 34. The cartridge member 16 is press fitted within the housing 12 and has the diaphragm members 44 and 46 sealingly connected thereto. The diaphragm members 44 and 46 are sealingly connected to the seal rings 36 and 38 respectively and urge the seal rings into contact with the planar surfaces 24 and 26 formed on the shaft engaging member 18.

As the shaft rotates, running fluid seals are formed between the seal ring 36 and the planar surface 24 and between the seal ring 38 and the planar surface 26. Thus, a double running seal is formed within the cartridge seal unit 14.

The double seal provides an initial seal against fluid and a secondary, auxiliary, seal to prevent any leakage, which may escape the first seal, from passing completely through the seal unit. The low friction contact between the seal rings 36 and 38 and the polished, planar surfaces 24 and 26 of the shaft engaging member 18 produces a minimum of wear on the seal elements. Nevertheless, the diaphragm members 44 and 46, by urging the seal rings axially into constant contact with the shaft engaging member 18, compensate for any slight wear which might occur and maintain the seal fluid tight. The cartridge seal unit of FIGURE 1 may be readily removed and replaced by forcing the cartridge member 16 out of the housing member 12 and sliding the cartridge seal unit 14 axially off the shaft 10.

Figure 2:
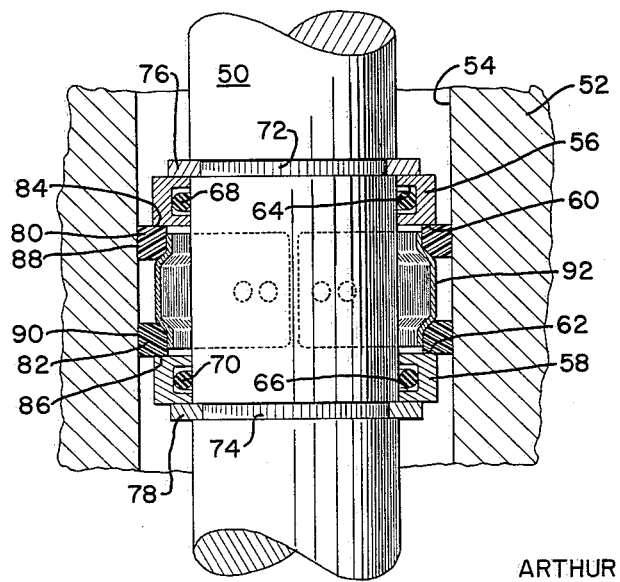
FIGURE 2 is a sectional view of another embodiment of the shaft seal of the present invention.

Referring to FIGURE 2, a second embodiment of a seal unit built in accordance with the principles of the present invention is there shown. A rotatable shaft 50 is journaled for rotation within a fixed housing member 52 and may be suitably supported by bearings (not shown). An enlarged bore 54 within the housing 52 surrounds the cylindrical shaft 50.

The shaft 50 has annular shaft engaging members 56 and 58 disposed thereabout which are axially spaced from each other on the shaft 50. Shaft engaging member 56 has a planar, polished surface 60 formed thereon. Shaft engaging member 58 has a planar, polished surface 62 formed thereon. The planar, polished surfaces 60 and 62 on the respective shaft engaging members 56 and 58 are axially spaced from each other and face toward each other. Shaft engaging member 56 has an annular groove 64 formed therein and shaft engaging member 58 has an annular groove 66 formed therein. Disposed within the annular grooves 64 and 66 respectively are O-rings 68 and 70 to form static seals between the respective shaft engaging members 56 and 58 and the shaft 50. The shaft engaging members 56 and 58 and O-rings 68 and 70 are similar to the shaft engaging member 18 and O-ring 34 illustrated in FIGURE 1 and previously described in that the O-rings 68 and 70 produce a high coefficient of friction between shaft 50 and shaft engaging members 56 and 58. The shaft engaging members 56 and 58 and shaft 50 do not under ordinary operating conditions move relative to each other. The shaft engaging members 56 and 58 are therefore adapted to rotate with the shaft 50.

Formed in the shaft 50 are axially spaced annular grooves 72 and 74. Disposed in groove 72 is a snap ring 76 and disposed in groove 74 is a snap ring 78. The snap rings 76 and 78 provide stop means to limit the axial movement of shaft engaging members 56 and 58 away from each other.

Disposed between the shaft engaging members 56 and 58 are seal rings 80 and 82. Seal ring 80 has a planar surface 84 formed thereon which abuts the shaft engaging member 56. Seal ring 82 has a planar surface 86 formed thereon which abuts the shaft engaging member 58. The outer periphery 88 of seal ring 80 and the outer periphery 90 of seal ring 82 are in static sealing relation with the bore 54 formed in housing 52.

The seal rings 80 and 82 may be formed of any suitable material but are preferably formed of a self-lubricating, relatively nonresilient plastic material such as Teflon. The shaft engaging members 56 and 58, which are in close sliding relation with the shaft 50, are preferably formed of a copper-bronze alloy.

The seal rings 80 and 82 are axially spaced from each other and abut the respective shaft engaging members 56 and 58. An annular resilient means 92 is disposed between the seal rings 80 and 82 to urge them axially into contact with the respective shaft engaging members 56 and 58. The resilient means 92 may be formed of any suitable material and is shown to be a split, spring-steel ring in the disclosed embodiment.

In operation, the shaft 50 and the shaft engaging members 56 and 58 rotate together. Static seals formed by O-rings 68 and 70 prevent fluid from passing between the shaft member 50 and the shaft engaging members 56 and 58. Annular seal rings 80 and 82 are in static sealing relation with the housing member 52 and abut the respective planar surfaces 60 and 62 of the shaft engaging members 56 and 58. Running fluid seals are created between the seal ring 80 and planar, polished surface 60 of shaft engaging member 56 and between the seal ring 82 and the planar, polished surface 62 of shaft engaging member 58. As in the embodiment of FIGURE 1, a double running fluid seal is created between the shaft 50 and the housing member 52. The resilient means 92 which urges the seal rings 80 and 82 into contact with the shaft engaging members 56 and 58 respectively compensates for any slight wear which might occur between the relatively moving elements of the running seals.

According to the provisions of the patent statutes, we have explained the principle, preferred construction, and mode of operation of our invention and have illustrated and described what we now consider to represent its best embodiments. However, we desire to have it understood that, within the scope of the appended claims, the invention may be practiced otherwise than as specifically illustrated and described.

We claim:

1. A fluid seal adapted to prevent leakage of fluid between a fixed housing member and a rotating shaft, said seal comprising first and second annular members disposed about said shaft, said first and second annular members being axially spaced from each other on said shaft, stop means on said shaft to limit axial movement of said annular members away from each other, first and second resilient static seal means disposed between said shaft and said first and second annular members respectively to nonrotatably secure said annular members to said shaft and to sealing engage said annular members to said shaft to thereby provide a fluid seal between said annular members and said shaft, each of said annular members having a radially extending, polished, planar surface, said annular member polished, planar surfaces facing each other and being axially spaced from each other, a first seal ring disposed between said first and second shaft engaging annular members and abutting said first annular member polished, planar surface, a second seal ring disposed between said first and second shaft engaging annular members and abutting said second annular member polished, planar surface, said first and second seal rings being formed of self-lubricating plastic material and having their outer peripheries in engagement with said fixed housing member, and resilient means urging said seal rings axially apart and radially urging each of said seal rings into static sealing engagement with said fixed housing member, said axial urging of said seal rings causing said first and second seal rings to slidingly engage said first and second shaft engaging annular member polished, planar surfaces respectively to form running fluid seals between said annular members and said first and second seal rings.

2. A fluid seal adapted to prevent leakage of fluid between a fixed housing member and a rotating shaft, said seal comprising first and second annular members disposed about said shaft, said first and second shaft engaging annular members being axially spaced from each other on said shaft, a first snap ring secured to said shaft and limiting axial movement of said first annular member away from said second annular member, a second snap ring secured to said shaft and limiting axial movement of said second annular member away from said first annular member, first and second static seal means disposed between said shaft and said first and second annular members respectively to nonrotatably secure said annular members to said shaft and to sealingly engage said annular members to said shaft to thereby provide a fluid seal between said annular members and said shaft, each of said annular members having a radially extending, polished, planar surface, said annular member polished, planar surfaces facing each other and being axially spaced from each other, a first seal ring disposed between said first and second annular members and abutting said first annular member polished, planar surface, a second seal ring disposed between said first and second annular members and abutting said second shaft engaging annular member polished, planar surface, said first and second seal rings being formed of self-lubricating plastic material and having their outer peripheries in engagement with said fixed housing member, and an annular resilient member disposed axially between said seal rings, said resilient member urging said first and second seal rings axially apart into contact with said shaft engaging annular member polished, planar surfaces respectively to thereby form running fluid seals between said shaft engaging annular members and said first and second seal rings, said resilient member urging said first and second seal rings radially into static sealing engagement with said fixed housing member.

References Cited in the file of this patent

UNITED STATES PATENTS

| 1,505,321 | Dennedy | Aug. 19, 1924 |
| 2,000,341 | Larsh | May 7, 1935 |
| 2,104,355 | Rupp et al. | Jan. 4, 1938 |
| 2,467,960 | Brady | Apr. 19, 1949 |
| 2,831,713 | Smith | Apr. 22, 1958 |

FOREIGN PATENTS

| 632,957 | Great Britain | Dec. 5, 1949 |